(12) United States Patent
Lukose et al.

(10) Patent No.: US 9,356,849 B2
(45) Date of Patent: May 31, 2016

(54) POPULATION CATEGORY HIERARCHIES

(75) Inventors: Rajan Lukose, Oakland, CA (US);
Craig P. Sayers, Menlo Park, CA (US);
Martin B. Scholz, San Francisco, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 339 days.

(21) Appl. No.: 13/985,110

(22) PCT Filed: Feb. 16, 2011

(86) PCT No.: PCT/US2011/025030
§ 371 (c)(1),
(2), (4) Date: Aug. 13, 2013

(87) PCT Pub. No.: WO2012/112149
PCT Pub. Date: Aug. 23, 2012

(65) Prior Publication Data
US 2013/0326060 A1    Dec. 5, 2013

(51) Int. Cl.
*G06F 15/173* (2006.01)
*H04L 12/26* (2006.01)
*G06F 17/30* (2006.01)
*G06Q 30/02* (2012.01)

(52) U.S. Cl.
CPC .......... *H04L 43/08* (2013.01); *G06F 17/30539* (2013.01); *G06Q 30/0201* (2013.01)

(58) Field of Classification Search
CPC .................. G06F 17/30539; H04L 43/08
USPC .................. 709/202–203, 223–224, 252
See application file for complete search history.

(56) References Cited

U.S. PATENT DOCUMENTS

| | | | |
|---|---|---|---|
| 5,721,910 A * | 2/1998 | Unger ................. | G06F 17/3061 707/999.104 |
| 5,924,090 A * | 7/1999 | Krellenstein ..... | G06F 17/30696 707/999.003 |
| 6,675,159 B1 | 1/2004 | Lin et al. | |
| 7,107,338 B1 * | 9/2006 | Nareddy ........... | G06F 17/30864 709/224 |
| 7,827,125 B1 | 11/2010 | Rennison | |
| 7,836,051 B1 * | 11/2010 | Mason .............. | G06F 17/30867 707/734 |
| 7,840,568 B2 * | 11/2010 | Purang et al. ................. | 707/748 |
| 7,886,047 B1 * | 2/2011 | Potluri ........................ | 709/224 |
| 8,645,384 B1 * | 2/2014 | Juang et al. .................. | 707/738 |
| 2001/0047356 A1 | 11/2001 | Ren et al. | |
| 2005/0050114 A1 * | 3/2005 | Soinio ............... | G06F 17/30575 707/999.204 |
| 2006/0184892 A1 | 8/2006 | Morris | |

(Continued)

OTHER PUBLICATIONS

Mining Concepts from Wikipedia for Ontology Construction.

*Primary Examiner* — Bharat N Barot
(74) *Attorney, Agent, or Firm* — Brooks, Cameron & Heubsch, PLLC

(57) ABSTRACT

Developing a population category hierarchy can include providing a candidate category hierarchy, including a number of candidate categories, and a mapping between a number of reference pages and the number of candidate categories, including a number of mapped reference pages (143). Population usage data of the number of mapped reference pages can be obtained and used to determine a population traffic metric for each of the number of candidate categories (147). A number of population categories can be generated by using the population traffic metric of each of the number of candidate categories (149); and, a population category hierarchy can be produced including the number of population categories (151).

20 Claims, 6 Drawing Sheets

(56) References Cited

U.S. PATENT DOCUMENTS

| | | |
|---|---|---|
| 2007/0038655 A1 | 2/2007 | Bronstad |
| 2007/0118498 A1 | 5/2007 | Song et al. |
| 2007/0118542 A1 | 5/2007 | Sweeney |
| 2007/0219986 A1 | 9/2007 | Egozi |
| 2008/0109420 A1 | 5/2008 | Britton et al. |
| 2008/0263200 A1 | 10/2008 | Or Sim et al. |
| 2010/0114916 A1 | 5/2010 | Cooke |
| 2010/0185689 A1 | 7/2010 | Hu et al. |
| 2013/0166634 A1* | 6/2013 | Holland .............. H04L 67/2804 709/203 |

* cited by examiner

POPULATION CATEGORY HIERARCHIES

BACKGROUND

A user's web browsing history is a rich data source representing a user's implicit and explicit interests and intentions. Completed, recurring, and ongoing tasks of varying complexity and abstraction can be found in a user's web browsing history and is consequently a valuable resource. Mechanisms that organize a user's web browsing history have been introduced. As the internet continues to become ever more essential and the key tool for information seeking and retrieval, various web browsing mechanisms that organize a user's web browsing history have been introduced.

DETAILED DESCRIPTION

Figure 1:
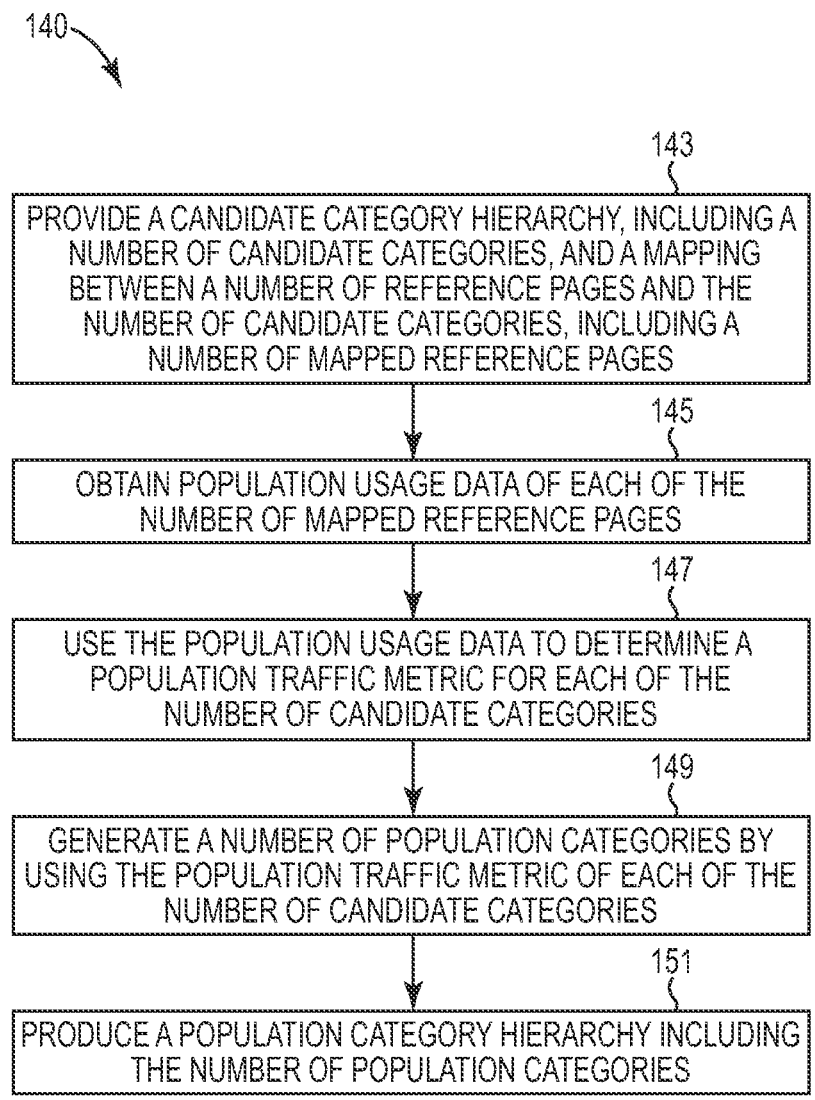
FIG. 1 illustrates an example of a method for developing a population category hierarchy according to the present disclosure.

The present disclosure provides methods, machine readable media, and systems for developing population category hierarchies. A mapping can be provided between a number of reference pages and the number of candidate categories to create a number of mapped reference pages. Population usage data of the number of mapped reference pages can be obtained and used to determine a population traffic metric for each of the number of candidate categories. A number of population categories can be generated by using the population traffic metric of each of the number of candidate categories; and, a population category hierarchy can be produced, including the number of population categories.

For example, implementation of a category hierarchy started in the United States can include a category labeled "sports" which can include a subcategory "baseball" but not a subcategory "Australian rules football." If the category path system were ported to Australia it could be advantages for information to be generated that indicates "Australian rules football" should be a subcategory. In an example, the use of web based services such as, for example, Wikipedia™ can be used to tailor a category hierarchy to a population by the use of usage data from a defined population to properly weight categories and subcategories. Additional categories can consume resources and add complexity, but additional tailored categories can also aid in organizing and categorizing hierarchies.

In the present disclosure, reference is made to the accompanying drawings that form a part hereof, and in which is shown by way of illustration how one or more examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Similar elements or components between different figures can be identified by the use of similar digits. For example, 214 can reference element "14" in FIG. 2, and a similar element can be referenced as 314 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a flow chart illustrating an example of a method 140 for developing a population category hierarchy according to one or more examples of the present disclosure. Examples of the present disclosure are not limited to the steps illustrated in FIG. 1. The method includes a candidate category hierarchy, including a number of candidate categories, and a mapping provided at step 143. A candidate category hierarchy can include a publicly available source of ontology information in which various concepts are assigned to one or more categories. A candidate category hierarchy can be provided, for example, by a web-based service. For example, in the Wikipedia™ database, each of the articles is assigned a particular concept. In addition, the concepts are assigned to particular categories and sub-categories defined by the editors of the Wikipedia™ database. Such examples can be beneficial in providing for a starting point for development of a population category hierarchy.

According to an example, some or all of the provided candidate category hierarchy can be manually defined. The candidate category levels that are not manually defined can be computed from categorical information contained in a labeled text data source. A labeled text data source generally comprises a third-party database of articles such as Wikipedia™, Freebase™, IMDB™, among others. For instance, a user can define a category and one or more subcategories and can rely on the candidate category levels contained in the labeled text data source for the remaining subcategories in the hierarchy of predefined category levels. According to an example, a user can define the hierarchy of predefined candidate category levels as a tree structure and can map the categories of the labeled text data source into the tree structure. A tree structure is a common way that can be used to represent a hierarchical nature of a structure in a graphical format. An example can include a recorded relevance of each concept to each category as the probability that another article that mentions that concept would appear in that category.

A mapping is provided between the candidate categories in the candidate category hierarchy and a number of reference pages, including a number of mapped reference pages at step 143. A reference page can include, for example, in the Wikipedia™ database, the articles assigned to concepts which are additionally assigned to particular categories and subcategories. A reference page could further, for example, be manually defined. Construction of a mapping between the number of reference pages and the candidate categories can be accomplished by a computing device, such as the one discussed below and shown in FIG. 2. For example, the labeled text data source corpus can be analyzed by the computing device to find categories for each concept by mapping the labeled text data source categories into a category graph (e.g., a manually constructed category tree), find phrases related to each category by using the text of reference pages assigned to concepts of each category, find phrases related to each concept by using text anchor tags which point to that concept, and evaluate counts of occurrences to determine the probability that an occurrence of a particular phrase indicated by the text is relevant to a particular category or a particular concept. For example, if 10% of reference pages (e.g., articles) containing the text "Tiger" are in the category "Golf", then the probability of an input text being in the category "Golf", given that it contains the text "Tiger", is 0.1. As another example, if 30% of the occurrences of the text "Tiger" link to the article labeled with the concept "Tiger Woods", then the probability that the input text is related to "Tiger Woods", given that we've observed it contains the text "Tiger", is 0.3.

Population usage data of each of the number of mapped reference pages are obtained at step 145. A population can be defined, for example, by a particular geographic region or politically defined country borders. A population can further be defined, for example, by type of device used to access the reference page (e.g., mobile device). In an example, a population can be defined by a number of resources including: user defined parameters, cell phone signals, cell phone tower signals, Global Position System (GPS) device signals, Internet Service Provider (ISP) information, and web-based service information. Web-based services can include Wikipedia™, Freebase™, IMDB™, among others. Population usage data can include timestamps, which can be used to estimate a time each visitor spent on each mapped reference page, and a total number of visits to each mapped reference page. Timestamps can, for example, be visitor specific and include a time the visitor arrives at a page and a time the visitor leaves the page. In such examples, the number of timestamps can be considered a number of sets of timestamps (e.g., beginning and ending timestamps). The total number of visits can, for example, be a total number of visits to a page per visitor (e.g., the number of times a visitor frequents a page). In another example, the total number of visits can be the overall total of the number of visits to a reference page. In another example, population usage data can include usage data of pages related to the number of mapped reference pages. Such examples can be beneficial in providing greater information regarding a defined population and tailoring categories to aid in organization and categorization of hierarchies.

A population traffic metric is determined for each of the number of candidate categories by using the population usage data at step 147. A population traffic metric can include, for example, a summation of the number of visits to each of the number of reference pages mapped to the candidate category. In an example, a population traffic method can be determined by assigning a weight according to the timestamp population usage data. For example, the weight given to the population traffic metric can have a positive relationship to the estimated time each visitor spent on each mapped reference page.

The population traffic metric of each of the number of candidate categories is used to generate a number of population categories at step 149. In an example, candidate categories for which the population traffic metric falls below a chosen threshold level can be deleted to create the number of population categories. Population categories can, for example, be generated through rank of candidate categories by population traffic metric and retaining candidate categories above a threshold. In another example, addition of candidate categories can generate the number of population categories. Population categories can be generated through a merge and/or split of candidate categories. A merge and/or split can, for example, be done according to an input from a user. For example, candidate categories with population traffic metrics lower than a threshold to justify designation of the candidate category as an entire population category, but higher than a threshold to justify deletion of the candidate category could be merged to obtain a threshold population traffic metric to justify a population category. In another example, a candidate category can have a population traffic metric above a threshold at which the population traffic metric allows adequate categorization. Consequently, the candidate category can, for example, be split into multiple, population categories.

At step 151, a population category hierarchy is produced that includes the number of population categories. In an example, the mapping can be modified to create a population mapping, wherein the number of mapped reference pages are re-mapped to the number of population categories. In another example, the population mapping can be created by the use of relevance metrics for each of the number of population categories to identify a relevance level for each of the number of population categories and the number of mapped reference pages. The mapped reference pages can, for example, be re-mapped according to the relevance level of each of the number of population categories. For example, a relevance metric can take into account the number of times a mapped reference page is mapped in the population mapping. A user, in an example, can provide input to approve or disapprove of a produced population mapping. Such user input examples can be beneficial because a user can to take into account certain factors that the produced population mapping did not in a particular instance (e.g., time of year or current trends) and allow the user to decide to disapprove and/or alter the mapping. Another example includes repetition of any of the above steps at a defined interval to update the number of population categories.

Figure 2:
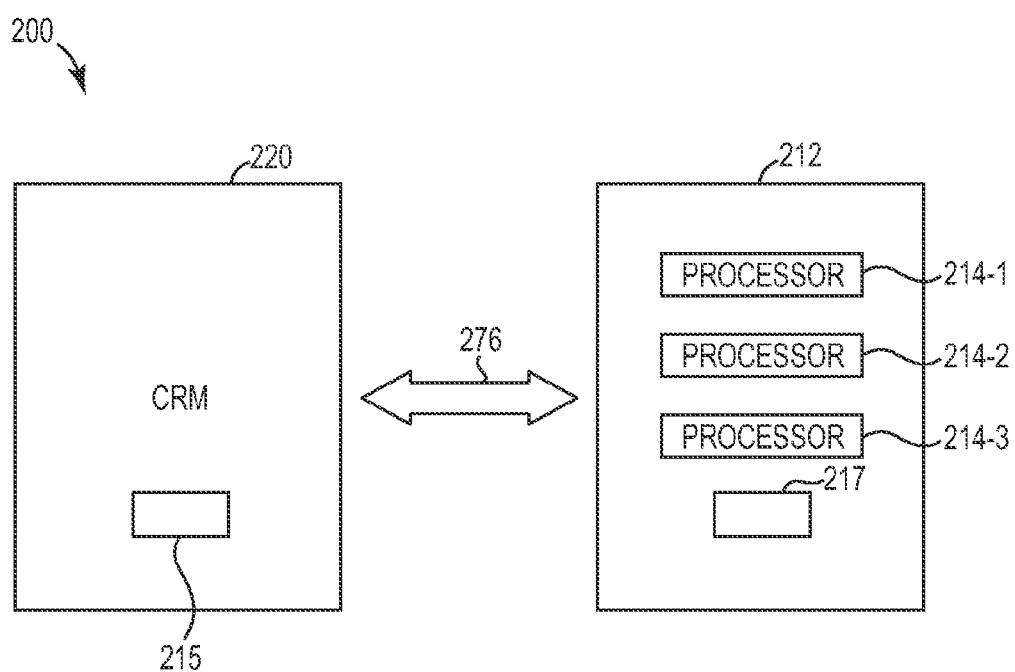
FIG. 2 illustrates a block diagram of an example of a system for developing a population category hierarchy according to the present disclosure.

FIG. 2 illustrates a block diagram 200 of an example of a computer-readable medium (CRM) 220 in communication with a computing device 212 (e.g., Java application server) having memory resources 217 and processor resources of more or fewer than 214-1, 214-2, 214-3, that can be in communication with, and/or receive a tangible non-transitory computer readable medium (CRM) 220 storing a set of computer readable instructions 215 executable by one or more of the processor resources (e.g., 214-1, 214-2, 214-3) for profiling a server, as described herein.

Memory resources 217 can include volatile and/or non-volatile memory. Volatile memory, as used herein, can include memory that depends upon power to store information, such as various types of dynamic random access memory (DRAM), among others. Non-volatile memory, as used herein, can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), High Definition Digital Versatile Discs™ (HD DVD™), compact discs (CD), and/or a solid state drive (SSD), flash memory, etc., as well as other types of machine-readable media.

Processor resources can execute computer-readable instructions 215 that are stored on an internal or external non-transitory computer-readable medium 220. A non-transitory computer-readable medium (e.g., computer readable medium 220), as used herein, can include volatile and/or non-volatile memory.

The non-transitory computer-readable 220 medium can be integral, or communicatively coupled, to a computing device, in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet).

The CRM 220 can be in communication with the processor resources (e.g., 214-1, 214-2, 214-3) via a communication path 276. The communication path 276 can be local or remote to a machine associated with the processor resources (214-1, 214-2, 214-3). Examples of a local communication path 276 can include an electronic bus internal to a machine such as a computer where the CRM 220 is one of volatile, non-volatile, fixed, and/or removable storage medium in communication with the processor resources (e.g., 214-1, 214-2, 214-3) via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 276 can be such that the CRM 220 is remote from the processor resources (e.g., 214-1, 214-2, 214-3) such as in the example of a network connection between the CRM 220 and the processor resources (e.g., 214-1, 214-2, 214-3). That is, the communication path 276 can be a network connection. Examples of such a network connection can include a local area network (LAN), a wide area network (WAN), a personal area network (PAN), and the Internet, among others. In such examples, the CRM 220 may be associated with a first computing device and the processor resources (e.g., 214-1, 214-2, 214-3) may be associated with a second computing device 212 (e.g., a Java application server).

Figure 3:
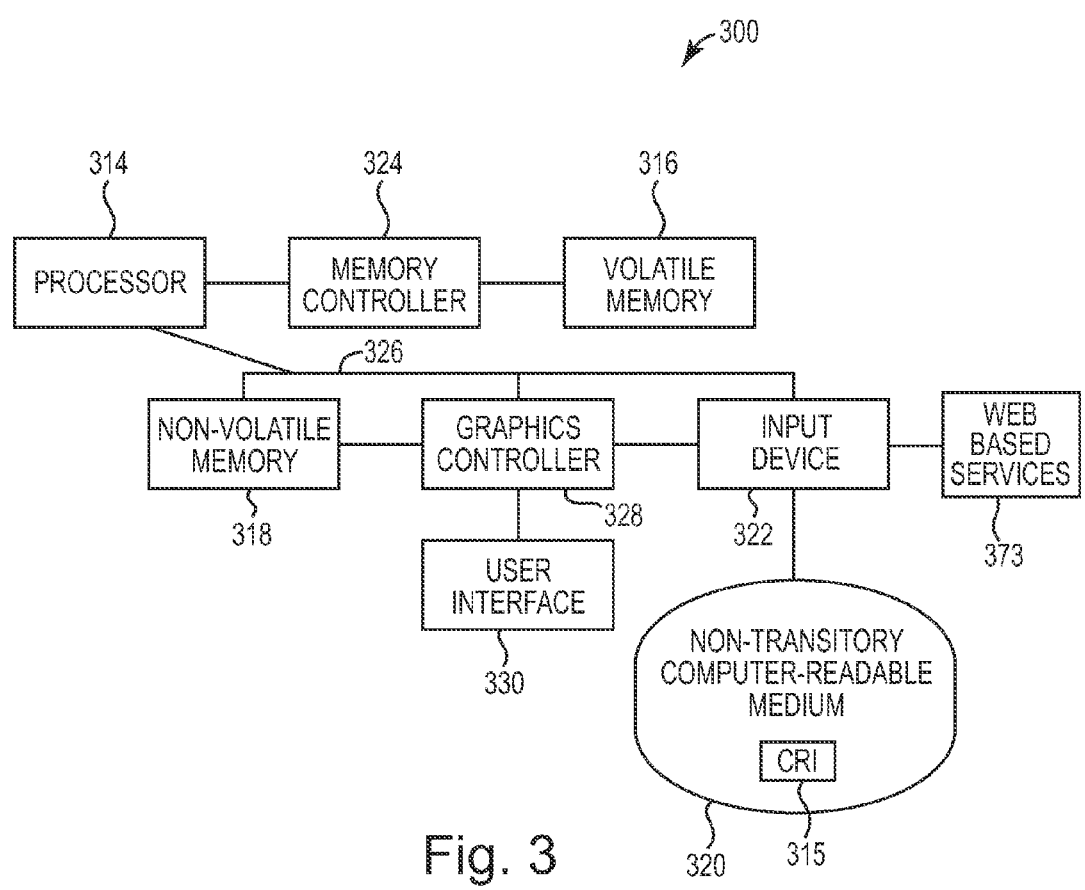
FIG. 3 illustrates a block diagram of an example of a computer-readable medium (CRM) in communication with processing resources for developing a population category hierarchy according to the present disclosure.

FIG. 3 illustrates a block diagram of an example of a computing system 300 for developing a population category hierarchy according to the present disclosure. However, examples of the present disclosure are not limited to a particular computing system configuration. The system 300 can include processor resources 314 and memory resources (e.g., volatile memory 316 and/or non-volatile memory 318) for executing instructions stored in a tangible non-transitory medium (e.g., volatile memory 316, non-volatile memory 318, and/or computer-readable medium 320) and/or an application specific integrated circuit (ASIC) including logic configured to perform various examples of the present disclosure. A computer (e.g., a computing device) can include and/or receive a tangible non-transitory computer-readable medium 320 storing a set of computer-readable instructions (e.g., software) via an input device 322. In an example, the input device 322 can receive input from a number of web based services 373. As used herein, processor resources 314 can include one or a plurality of processors such as in a parallel processing system. Memory resources can include memory addressable by the processor resources 314 for execution of computer-readable instructions. The computer-readable medium 320 can include volatile and/or non-volatile memory such as random access memory (RAM), magnetic memory such as a hard disk, floppy disk, and/or tape memory, a solid state drive (SSD), flash memory, phase change memory, etc. In some examples, the non-volatile memory 318 can be a database including a plurality of physical non-volatile memory devices. In various examples, the database can be local to a particular system or remote (e.g., including a plurality of non-volatile memory devices 318).

The processor resources 314 can control the overall operation of the system 300. The processor resources 314 can be connected to a memory controller 324, which can read and/or write data from and/or to volatile memory 316 (e.g., RAM). The memory controller 324 can include an ASIC and/or a processor with its own memory resources (e.g., volatile and/or non-volatile memory). The volatile memory 316 can include one or a plurality of memory modules (e.g., chips).

The processor resources 314 can be connected to a bus 326 to provide for communication between the processor resources 314, and other portions of the system 300. The non-volatile memory 318 can provide persistent data storage for the system 300. The graphics controller 328 can connect to a user interface 330, which can provide an image to a user based on activities performed by the system 300.

Each system can include a computing device including control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute computer-readable instructions that are stored on a non-transitory computer-readable medium (e.g. non-transitory computer-readable medium 320). The non-transitory computer-readable medium can be integral, or communicatively coupled, to a computing device, in either in a wired or wireless manner. For example, the non-transitory computer-readable medium 320 can be an internal memory, a portable memory, a portable disk, or a memory located internal to another computing resource (e.g., enabling the computer-readable instructions to be downloaded over the Internet). The non-transitory computer-readable medium 320 can have computer-readable instructions 315 stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), Blu-Ray Discs™, compact discs (CD), laser discs, and magnetic media such as tape drives, floppy discs, and hard drives, solid state media such as flash memory, EEPROM, phase change random access memory (PCRAM), as well as other types of computer-readable media.

Figure 4:
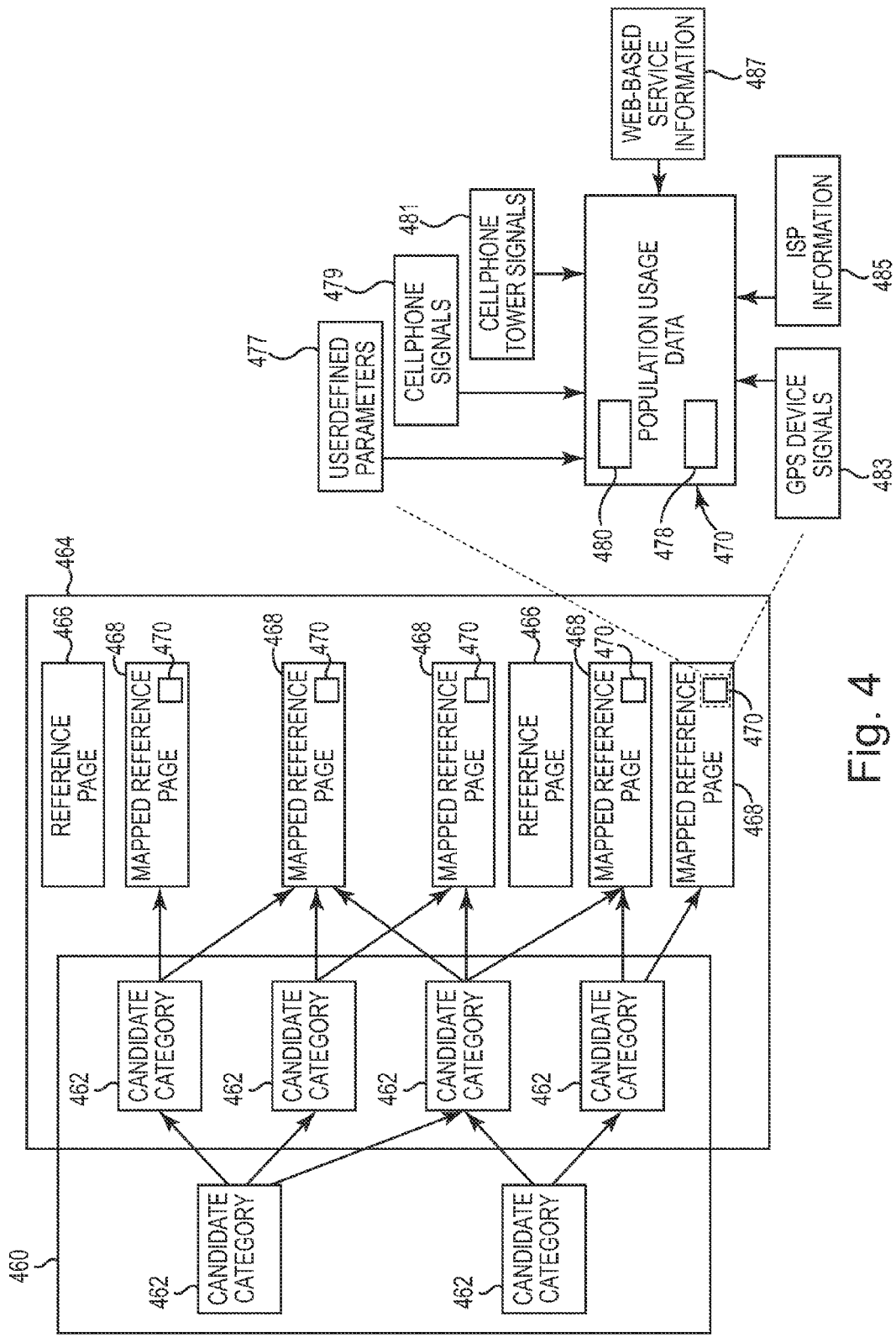
FIG. 4 illustrates a block diagram of an example of a candidate category hierarchy and a mapping according to the present disclosure.

FIG. 4 illustrates a block diagram of an example of a candidate category hierarchy 460 and a mapping 464 according to the present disclosure. Candidate category hierarchy 460 and the mapping 464 can, for example, be provided as described above (e.g., step 143 in FIG. 1). A candidate category hierarchy 460 can, for example, contain candidate categories 462. In an example, candidate categories 462 can be linked to a number of other candidate categories 462. For example, a candidate category 462 labeled "Sports" can be linked to other candidate categories 462 labeled, for example, "Baseball," "Football," and "Golf." Candidate categories 462, can be mapped to reference pages 466. Once a candidate category 462 has been mapped to a reference page 466, the reference page 466 is referred to as a mapped reference page 468. The block diagram illustrated in FIG. 4 includes a number of reference pages 466 that are not mapped to candidate categories 462 and a number of mapped reference pages 468 that are mapped to candidate categories 462. Candidate categories can be mapped to reference pages 466 to create a mapping 464 that contains a number of mapped reference pages 468. For example, a candidate category 462 labeled "Baseball" can be mapped to reference pages 466 such as the Minnesota Twins™ baseball club homepage (e.g., www.minnesota.twins.mlb.com), the official web-site of Major League Baseball™ (e.g., www.mlb.com), or the Wikipedia™ article on baseball (e.g., www.en.wikipedia.org/wiki/Baseball) to form a number of mapped reference pages 468.

Each mapped reference page 468, in an example, contains population usage data 470, however examples are not so limited as one or more mapped reference pages 468 may not include population usage data 470 and/or a reference page 466 (e.g., an unmapped reference page) may include population usage data 470. Population usage data 470 can include a number of timestamps 478 and/or a total number of visits 480 to a particular mapped reference page 468. In an example, the population usage data 470 can be stipulated by a number of parameters, including, but not limited to: user defined parameters 477, cell phone signals 479, cell phone tower signals 481, GPS device signals 483, ISP information 485, and/or web-based service information 487. For example, the population usage data 470 can be stipulated by a user defined parameter 477 to contain data only regarding visitors from a specific region (e.g., Australia, Europe, North America, etc.). In an example, multiple parameters can be used to stipulate the population usage data 470.

Figure 5:
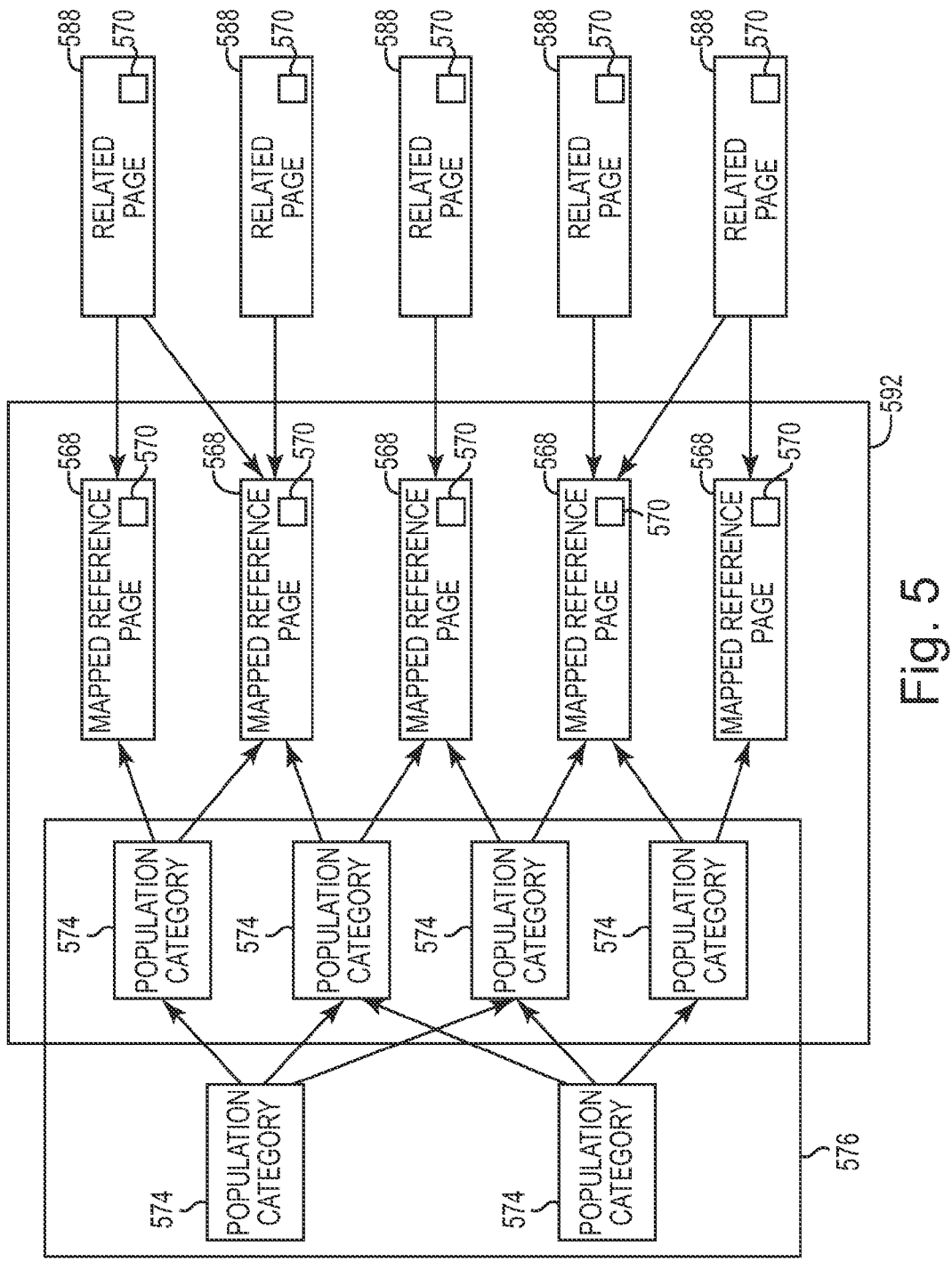
FIG. 5 illustrates a block diagram of an example of a population category hierarchy and a population mapping according to the present disclosure.

FIG. 5 illustrates a block diagram of an example of a population category hierarchy 576 and a population mapping 592 according to the present disclosure. Population category hierarchy 576 can, for example, be produced as described above (e.g., step 151 in FIG. 1). Prior to the population mapping 592, the population usage data 570 of each mapped reference page 568 can be used to determine a population traffic metric for each candidate category to generate a number of population categories 574. For example, a user can define a lower threshold limit for a population traffic metric. In an example, the lower threshold can be a specified total number of visits (e.g., visits 480 illustrated in FIG. 4) to all mapped reference pages 568 of a candidate category (e.g., candidate category 462 illustrated in FIG. 4). In such an example, any candidate category, below the specified total number of visits, can be removed from the mapping (e.g., mapping 464 illustrated in FIG. 4) to create population categories 574 in a population mapping 592.

Population categories 574 of population mapping 592 can maintain the same mapped reference pages as the candidate category or categories from which they were created. For example, if the candidate category "Minor League Baseball Teams in Minnesota" was mapped to the mapped reference page "St. Paul Saints" and the candidate category "Minor League Baseball Teams in Minnesota" did not receive above the minimum threshold of a total number of visits for all mapped reference pages (e.g., "St. Paul Saints") mapped to the candidate category, the candidate category can be merged with a similar candidate category "Minor League Baseball Teams in the USA" to create a population category 574 "Minor League Baseball Teams in the USA" that maintained the mapping to the mapped reference page 568 "St. Paul Saints" as well as any existing mapped reference pages of the candidate category "Minor League Baseball Teams in the USA." In such an example, the mapped reference pages 568 are maintained (e.g., not re-mapped as discussed in regards to FIG. 6) whereas the candidate categories are manipulated to form population categories 574.

The population categories 574, in an example, can be organized such that a population category 574 can be linked to other population categories 574 to create a population category hierarchy 576. In another example, population usage data 570 of related pages 588 to the number of mapped reference pages 568 can be used to produce the population category hierarchy 576. For example, a mapped reference page 568 can be the Minnesota Twins baseball club homepage, "www.minnesota.twins.mlb.com." Related pages 588 can include players on the Minnesota Twins baseball club (e.g., www.joe-mauer.org, www.thisisdspan.com, or www.twitter.com/mcuddy5) or blogs about the Minnesota Twins baseball club (e.g., www.aarongleeman.com, www.nickstwinsblog.com, or www.twinkietown.com). Such related pages 588 examples can be beneficial because the use of related pages 588 can make the population traffic metric more tailored to a particular topic and consequently can lead to the creation of a population category hierarchy 576 and population mapping 592 that are more reflective of a particular population.

Figure 6:
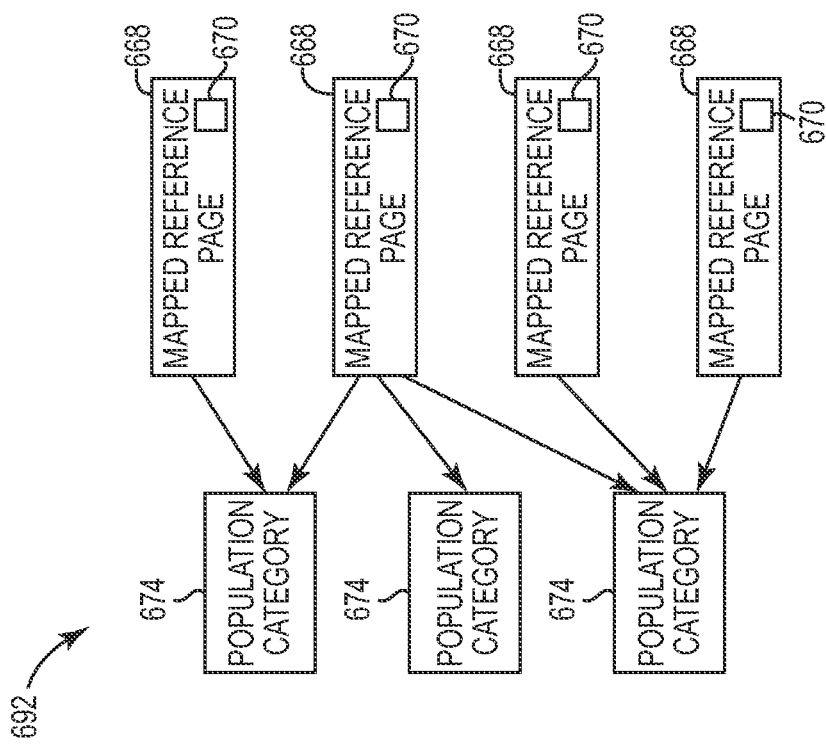
FIG. 6 illustrates an example of a population mapping according to the present disclosure.

FIG. 6 illustrates an example of a population mapping 692 according to the present disclosure. A population mapping can be created by re-mapping the number of mapped reference pages 668 to form the number of population categories 674 (e.g., after step 151 in FIG. 1). For example, a mapped reference page 668 referencing Tiger Woods can be mapped to a candidate category "Golf" (e.g., candidate category 462 illustrated in FIG. 4). The mapped reference page referencing Tiger Woods 668 can, in an example, be re-mapped, based on the population usage data 670, for example, to candidate categories "Celebrities," "Athletes," and/or "Sports Apparel" to create a number of population categories 674 in population mapping 692. Such re-mapping examples can be beneficial to update a population mapping 692 or make a more comprehensive population mapping 692.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." The term "a number of" is meant to be understood as including at least one but not limited to one. The phrase "in an example," as used herein does not necessarily refer to the same example, although it can.

What is claimed:

1. A method comprising:
    providing a candidate category hierarchy, including candidate categories, and a mapping between reference pages and the candidate categories, including mapped reference pages;
    obtaining population usage data of each of the mapped reference pages;
    using the population usage data to determine a population traffic metric for each of the candidate categories;
    generating population categories from the candidate categories by using the population traffic metric of each of the candidate categories; and
    producing a population category hierarchy including the population categories.

2. The method of claim 1, wherein the population usage data includes timestamps and a total number of visits to each of the mapped reference pages wherein the timestamps are used to estimate a time that visitors spent on each mapped reference page.

3. The method of claim 2, wherein determining the population traffic metric includes weighting according to the timestamps, wherein the weight given and the estimated time each visitor spent on each mapped reference page is a positive relationship.

4. The method of claim 2, wherein determining the population traffic metric includes summing the total number of visits to each of the mapped reference pages to a particular one of the candidate categories.

5. The method of claim 1, further comprising modifying the mapping to create a population mapping, wherein the mapped reference pages are re-mapped to form the population categories to create the population mapping.

6. The method of claim 5, wherein modifying includes:
    using relevance metrics for each of the population categories to identify a relevance level for each of the population categories and the mapped reference pages; and
    re-mapping the mapped reference pages according to the relevance level of each of the population categories.

7. The method of claim 1, wherein generating the population categories from the candidate categories includes reducing or merging candidate categories.

8. The method of claim 1, wherein generating the population categories from the candidate categories includes adding or splitting candidate categories.

9. The method of claim 1, wherein generating the population categories includes:
    receiving an input from a user;
    merging candidate categories; and
    splitting candidate categories.

10. The method of claim 1, comprising obtaining the candidate category hierarchy and the population usage data from a web based service.

11. The method of claim 1, further comprising defining a population for the population usage data according to a user defined parameter, cell phone signals, cell phone tower signals, Global Positioning Satellite (GPS) device signals, Internet Service Provider (ISP) information, web-based service information, or any combination thereof.

12. The method of claim 1, wherein generating the population categories from the candidate categories by using the population traffic metric comprises:
    deleting a candidate category from inclusion in the population categories when the population traffic metric of the candidate category falls below an inclusion threshold; and
    retaining a different candidate category as a population category when the population traffic metric of the different candidate category exceeds the inclusion threshold.

13. The method of claim 1, wherein generating the population categories from the candidate categories by using the population traffic metric comprises:
    identifying a first candidate category with a population traffic metric that is lower than inclusion threshold but higher than a deletion threshold;
    identifying a second candidate category also with a population traffic metric that is lower than the inclusion threshold but higher than the deletion threshold; and
    merging the first and second candidate categories into a population category.

14. The method of claim 1, wherein generating the population categories from the candidate categories by using the population traffic metric comprises:
    identifying that a particular candidate category has a population traffic metric that exceeds a categorization threshold; and
    splitting the particular candidate category into multiple population categories.

15. A non-transitory computer-readable medium storing a set of instructions executable by a processor to:
    provide a candidate category hierarchy, including candidate categories, and a mapping between reference pages and the candidate categories, including mapped reference pages;
    obtain population usage data of each of the mapped reference pages;
    use the population usage data to determine a population traffic metric for each of the candidate categories;
    generate population categories from the candidate categories by using the population traffic metric of each of the candidate categories;
    produce a population category hierarchy including the population categories; and
    modify the mapping to create a population mapping, wherein the mapped reference pages are re-mapped to the population categories to create the population mapping.

16. The non-transitory computer-readable medium of claim 15, wherein the medium further includes instructions to use population usage data of pages related to the mapped reference pages to produce the population category hierarchy.

17. The non-transitory computer-readable medium of claim 15, wherein the instructions to modify the mapping further include instructions to:
    use relevance metrics for each of the population categories to identify a relevance level for each of the population categories and the mapped reference pages; and
    re-map the mapped reference pages according to the relevance level of each of the population categories.

18. The A non-transitory computer-readable medium of claim 15, wherein the instructions to generate the population categories from the candidate categories by using the population traffic metric includes instructions to:
    delete a candidate category from inclusion in the population categories when the population traffic metric of the candidate category falls below an inclusion threshold; and
    retain a different candidate category as a population category when the population traffic metric of the different candidate category exceeds the inclusion threshold.

19. A system comprising:

a memory; and a processor coupled to the memory, to:

provide a candidate category hierarchy, including candidate categories, and a mapping between reference pages and the candidate categories, including mapped reference pages;

obtain population usage data of each of the mapped reference pages;

use the population usage data to determine a population traffic metric for each of the candidate categories;

generate a population categories by using the population traffic metric of each of the candidate categories;

produce a population category hierarchy including the population categories; and modify the mapping to create a population mapping, wherein the mapped reference pages are re-mapped to the population categories to create the population mapping.

20. The system of claim 19, wherein the processor is to generate the population categories from the candidate categories by using the population traffic metric includes instructions by:

deleting a candidate category from inclusion in the population categories when the population traffic metric of the candidate category falls below an inclusion threshold; and retaining a different candidate category as a population category when the population traffic metric of the different candidate category exceeds the inclusion threshold.

* * * * *